Dec. 21, 1943. L. A. WARD 2,337,512
TWO-WAY SPEED CONTROL VALVE
Filed Dec. 13, 1940
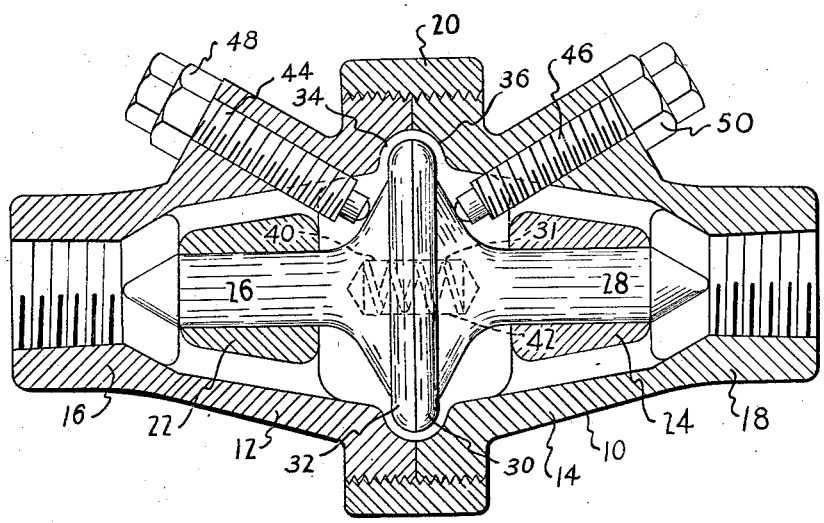
Fig-1-
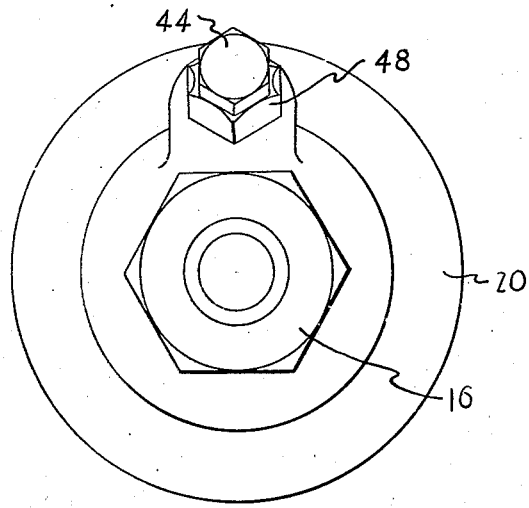
Fig-2-
Inventor
LOYD A. WARD
By Beaman & Langford
Attorney Patented Dec. 21, 1943

2,337,512

UNITED STATES PATENT OFFICE 2,337,512

TWO-WAY SPEED CONTROL VALVE

Loyd A. Ward, Jackson, Mich., assignor to Tomkins-Johnson Company, Jackson, Mich., a corporation of Michigan Application December 13, 1940, Serial No. 369,918

2 Claims. (Cl. 277—45)

The present invention relates to improvements in two-way control valves for fluids.

In compressed air and hydraulic equipment it is quite a common practice to have the fluid under pressure travel first in one direction and then in an opposite direction through the same line. Under certain conditions it is desirable that mechanism be provided for controlling the flow in opposite directions at different rates.

The present invention provides a simple, inexpensively constructed valve which may be inserted in any line carrying fluids under pressure which will function to control the rate of flow in either direction; there being means for adjusting the rate of flow to the desired extent.

Thus one of the objects of the present invention is to provide a valve of the type described which is simple and inexpensive in construction and may be readily adjusted as desired.

Other objects and advantages residing in the combination, construction and arrangement of parts will appear from the following detailed description. The invention is defined in the annexed claims.

In the accompanying drawing wherein a single embodiment of the present invention is disclosed, Fig. 1 is a vertical cross-sectional view of the valve, and Fig. 2 is an end elevational view.

As shown in the drawing, the valve 10 comprises two body portions 12 and 14 having threaded end portions 16 and 18 to enable the valve 10 to be inserted into any compressed air or hydraulic line. A nut 20 holds the portions 12 and 14 in assembled relation. Supported for axial movement in guides 22 and 24 are poppet valves 26 and 28 having head portions 30 and 32 which cooperate with the seats 34 and 36 to regulate the rate of flow through the valve. The valves 26 and 28 are both recessed at 38 and 40 to receive a spring 42 which functions to separate the valves 26 and 28 moving the same toward their respective seats 34 and 36. Adjustment screws 44 and 46 having lock nuts 48 and 50, may be separately adjusted to give the desired rate of flow in opposite directions through the valve 10.

In the position illustrated in Fig. 1, the rate of flow through the valve 10 would be equal in opposite directions. It will be understood that the flow of fluid through the valve 10 from left to right, as shown in Fig. 1, will be controlled by the valve 28 while the fluid from right to left will be controlled by the valve 26. In other words, if the adjustment screw 46 is backed off the flow of fluid from right to left will continue at the same rate while the flow of fluid from left to right will be reduced for the reason that the head 30 would have less clearance with the seat 36.

To install the valve 10 in the fluid line it is only necessary to cut the line, remove a section, and thread the separated ends of the line. When this is done the sections 12 and 14 may be readily threaded upon the ends of the line and the valves 26 and 28 inserted into position with the spring 42 in place. The assembly is then completed through the nut 20. From this it should be apparent to those skilled in the art that the valve may be readily inspected and parts thereof renewed with ease. The valve 10 is simple in design and may be inexpensively constructed. The adjustment shown may be readily made and will provide differential rates of flow in opposite directions throughout a wide range.

Having thus described my invention, what I desire to secure by Letters Patent and claim is:

1. A two-way valve of the type described comprising two main body portions having internally threaded inlet ends and externally threaded opposed ends, a nut upon said opposed ends for holding said body portions in assembled relation, poppet valves supported for axial movement in said body portions and being disposed in opposed axially aligned relation, seats for said poppet valves defined in the opposed ends of said body portions, resilient means opposed between said valves for urging the same toward their respective seat portions, and adjustable stop members with which said valves engage to limit movement toward their respective seats.

2. An adjustable valve for controlling the rate of fluid flow in opposite directions comprising a pair of similar body parts each having a passageway extending through the same, valves guided in each of said parts for restricting the flow of fluid in opposite directions, seats for said valves on said body parts, resilient means between said valves for urging said valves in opposite directions toward their respective seats, and separate adjustable means for limiting the movement of said valves toward their respective seats.

LOYD A. WARD.